United States Patent
Duan et al.

(10) Patent No.: US 10,951,529 B2
(45) Date of Patent: Mar. 16, 2021

(54) DYNAMIC SERVICE-BASED LOAD BALANCING IN A SOFTWARE-DEFINED WIDE AREA NETWORK (SD-WAN)

(71) Applicant: Fortinet, Inc., Sunnyvale, CA (US)

(72) Inventors: Shangwei Duan, Vancouver (CA); Xin Gu, Delta (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 16/218,726

(22) Filed: Dec. 13, 2018

(65) Prior Publication Data

US 2020/0195557 A1    Jun. 18, 2020

(51) Int. Cl.
*H04L 12/803* (2013.01)
*H04L 12/46* (2006.01)
*H04L 12/715* (2013.01)
*H04L 12/751* (2013.01)

(52) U.S. Cl.
CPC ........ *H04L 47/125* (2013.01); *H04L 12/4645* (2013.01); *H04L 45/02* (2013.01); *H04L 45/04* (2013.01); *H04L 45/64* (2013.01)

(58) Field of Classification Search
CPC ... H04L 47/125; H04L 12/4645; H04L 45/64; H04L 45/04; H04L 45/02
See application file for complete search history.

(56) References Cited

U.S. PATENT DOCUMENTS

| 8,787,154 | B1* | 7/2014 | Medved | H04L 45/12 |
| | | | | 370/225 |
| 8,824,274 | B1* | 9/2014 | Medved | H04L 47/20 |
| | | | | 370/217 |
| 9,325,525 | B2* | 4/2016 | Goel | H04L 12/4641 |
| 9,819,540 | B1* | 11/2017 | Bahadur | H04L 45/64 |
| 2014/0003232 | A1* | 1/2014 | Guichard | H04L 67/1029 |
| | | | | 370/230 |

(Continued)

OTHER PUBLICATIONS

Chandra, P., et al. "BGP Communities Attribute." Network Working Group. Aug. 1996. 5 pgs.

(Continued)

*Primary Examiner* — John A Follansbee
*Assistant Examiner* — Lam T Do
(74) *Attorney, Agent, or Firm* — Law Office Of Dorian Cartwright; Dorian Cartwright (57) ABSTRACT

Systems and methods for dynamic service-based load balancing in an SD-WAN are provided. According to one embodiment, a routing protocol daemon of an SDN controller within a spoke network receives a dynamically assigned subnet and associated attributes for a client device newly registered with the hub network. The routing protocol daemon tags the subnet with a route tag using a route map based on the received attributes meeting network administrator-defined match criteria for corresponding attributes associated with the route tag in the route map. The tagged subnet is communicated to an SD-WAN daemon of the SDN controller, which translates an SD-WAN service rule defined with reference to the route tag to an SD-WAN service rule defined with reference to the subnet. A load balancer associated with the spoke network is caused to perform load balancing of incoming network traffic in accordance with the translated SD-WAN service rule.

18 Claims, 8 Drawing Sheets

(56) References Cited

U.S. PATENT DOCUMENTS

| | | | | |
|---|---|---|---|---|
| 2014/0269327 A1* | 9/2014 | Fulknier | ................ | H04L 41/00 |
| | | | | 370/237 |
| 2014/0380460 A1* | 12/2014 | Bhalerao | ................ | H04L 63/20 |
| | | | | 726/14 |
| 2015/0149812 A1* | 5/2015 | Arisoylu | ................ | H04L 43/50 |
| | | | | 714/4.1 |
| 2017/0207963 A1* | 7/2017 | Mehta | .................... | H04L 43/08 |
| 2018/0262389 A1* | 9/2018 | Soderlund | ........... | H04L 41/0806 |
| 2018/0375686 A1* | 12/2018 | Rangaraman | ....... | H04L 12/4666 |
| 2019/0036813 A1* | 1/2019 | Shenoy | .............. | H04L 12/4633 |
| 2019/0334866 A1* | 10/2019 | Theogaraj | ........... | H04L 63/0209 |
| 2019/0334909 A1* | 10/2019 | Schmitt | ................ | G06F 21/575 |
| 2020/0044914 A1* | 2/2020 | Turabi | ................ | H04L 41/0668 |

OTHER PUBLICATIONS

Rekhter, Y., et al. "A Border Gateway Protocol 4 (BGP-4)." Network Working Group. Jan. 2006. 104 pgs.

* cited by examiner

| IP Address | Interface | Metric | Route Tag |
|---|---|---|---|
| 120.15.179.0 | 10.1.10.149 | 10 | 3 |
| 192.168.1.0 | 192.168.1.250 | 1 | 6 |
| 192.168.1.250 | 127.0.0.1 | 20 | 8 |
| ⋮ | ⋮ | ⋮ | ⋮ |

```
config router route-map
edit <route-map name>
config rule
edit 1
set <match criteria>
set set-route-tag <tag id>
end
```

```
config router bgp
config neighbor
edit <neighbor IP>
set route-map-in <name of route map>
next
end
end
```

```
config system virtual-wan-link
config service
edit 1
set mode <link selection mode>
set link-cost-factor <latency | jitter | packet loss>
set route-tag <tag id>
set priority-members <interface ids>
next
end
end
```

```
For each subnets received {
For each route_map {
if (route_map->match(subnet->attribute) == MATCH)
route_map->set(subnet, route_map)
}
}
```

```
For each subnet received {
if (this subnet is not selected into data plane routing table)
continue;
if (this subnet is not tagged)
continue;
copy this subnet into the shared memory;
shared_memory.dirty = 1;
}
```

```
while (1) {
if (shared_meory.dirty == 0) {
sleep(2);
continue;
}
copy all subnets to the local memory;
for each service defined in the SD-WAN {
if (service->route_tag == subnet->route_tag) {
replace the tag by the subnet as signature;
create a SD-WAN rule with service including the subnet;
if an existing SD-WAN rule with the same service ID is in the data plane
replace the SD-WAN rule with the new one
else
insert the new SD-WAN rule
}
}
shared_memory.dirty = 0;
sleep(2);
}
```

DYNAMIC SERVICE-BASED LOAD BALANCING IN A SOFTWARE-DEFINED WIDE AREA NETWORK (SD-WAN)

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2018, Fortinet, Inc.

BACKGROUND

Field

Embodiments of the present invention generally relate to network communications. In particular, embodiments of the present invention relate to performing dynamic load balancing in a Software-Defined Wide Area Network (SD-WAN) configured using a hub and spoke topology.

Description of the Related Art

Wide Area Networks (WANs) allow enterprises to extend their networks over large distances by connecting remote branch networks to data centers in order to deliver applications and services required to perform a variety of functions. In a hub and spoke topology, multiple network devices (remote peers or spokes) communicate securely with a central network device in a data center (hub), for example, using a separate and secured tunnel that extends between each individual spoke and the hub. The traffic can pass between enterprise data centers between the hub and branch networks between the spokes as well as between peer branch networks through the hub.

An SD-WAN simplifies management and operation of a WAN by decoupling networking hardware from the control mechanism that handles network policies and determines availability of network bandwidth for appropriate routing of traffic. In an SD-WAN, applications and services are typically statically identified to provide cloud connectivity. For example, network administrators define any or a combination of a batch of Internet Protocol (IP) addresses, Transmission Control Protocol (TCP) ports, User Datagram Protocol (UDP) ports, protocol numbers and Differentiated services code point (DSCP) tags as signatures of services. Therefore, when traffic passes through the network devices, matching process can be executed against pre-configured service signatures and corresponding matching policies can also be applied accordingly.

In an existing attempt to support dynamic service provisioning in the context of SD-WAN, an Internet Service Database (ISDB) is utilized to map a three-tuple (i.e. a protocol number, a port number and an IP address) to an application or service as a signature. These three-tuples are automatically learned based on a data mining algorithm implemented within the cloud. While use of an ISDB provides relatively more flexibility than a pre-defined static configuration, the ISDB refresh rate of on the order of several hours is not sufficient to instantly reflect changes for dynamic provisioning. Dynamic provisioning could alternatively be achieved with support of a Fully Qualified Domain Name (FQDN), which defines a name instead of an IP address as a signature of a service with the corresponding IP addresses as signatures being resolved and updated as a result of Domain Name System (DNS) resolution; however, DNS is not intended for a dramatically changing environment due to its limited updating frequency. As such, FQDNs are better as a supplemental method for dynamically provisioned applications.

In view of the foregoing, there is a need for development of a solution that supports dynamic services in an SD-WAN.

SUMMARY

Systems and methods are described for dynamic service-based load balancing in a Software Defined Wide Area Network (SD-WAN). According to one embodiment, in response to registration of a client device with a hub network of an SD-WAN having a hub and spokes topology, a routing protocol daemon receives a subnet assigned to the client device by the hub and associated attributes. The routing protocol daemon runs on a Software-Defined Networking (SDN) controller associated with a control plane of spoke network of multiple spoke networks of the SD-WAN and tags the subnet with a route tag using a route map. The tagging is performed based on the one or more attributes meeting network administrator-defined match criteria for corresponding one or more attributes associated with the route tag in the route map. The routing protocol daemon communicates the tagged subnet to an SD-WAN daemon running on the SDN controller. In response to receiving the tagged subnet, the SD-WAN daemon translates an SD-WAN service rule defined within the SD-WAN daemon in terms of the route tag to an SD-WAN service rule defined in terms of the subnet. The SD-WAN daemon causes a load balancer associated with a data plane of the spoke network to perform load balancing of incoming network traffic received by the load balancer. The load balancing is performed in accordance with the translated SD-WAN service rule by installing the translated SD-WAN service rule within the load balancer.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Systems and methods are described for dynamic serviced-based load balancing in a Software Defined Wide Area Network (SD-WAN).

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrase "security device" generally refers to a hardware or virtual device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, load balancing and traffic shaping—that can be deployed individually as a point solution or in various combinations as a unified threat management (UTM) solution. Non-limiting examples of network security devices include proxy servers, firewalls, VPN appliances, gateways, UTM appliances and the like.

The terms "hub and spoke topology" or "hub and spoke architecture" generally refer to a network architecture in which spokes are connected to each over via a hub. In the context of a hub-and-spoke site-to-site WAN network topology, for example, one physical site acts as the hub (e.g., the main office or headquarters), while other physical sites act as spokes. The spoke sites are connected to each other via the hub site.

The term "dynamic routing protocol" generally refers to routing protocols that facilitate routing of data traffic via an optimal path towards a destination when there is a possibility of multiple paths. Routing protocols allow network devices that perform routing to exchange routing information. The "dynamic" part refers to the protocol's ability to recalculate and re-route traffic when more optimal paths become available or when links along most optimal path fail. Non-limiting examples of dynamic routing protocols include Border Gateway Protocol (BGP), Routing Information Protocol (RIP), Interior Gateway Routing Protocol (IGRP), Enhanced IGRP (EIGRP), and Open Shortest Path First (OSPF).

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these specific embodiments. Numerous modifications, changes, variations, substitutions, and equivalents will be apparent to those skilled in the art, without departing from the spirit and scope of the invention, as described in the claims.

Systems and methods are described for dynamic serviced-based load balancing in an SD-WAN. According to various embodiments of the present disclosure, in response to registration of a client device with a hub network of an SD-WAN having a hub and spokes topology, a routing protocol daemon can receive a subnet assigned to the client device by the hub and one or more attributes regarding the path or the route to a group of clients within this subnet via a dynamic routing protocol (e.g., a Border Gateway Protocol (BGP) Open, Update, Keepalive or Notification message). The one or more attributes used to convey information regarding the path or the route may include one or more BGP path attributes (e.g., Orgin, AS_Path, Next_Hop, Multi_Exit_Disc, Local_Pref, Automatic_Aggregate and Aggregator) as defined in section 5 of Request for Comments 4271, which is hereby incorporated by reference in its entirety for all purposes. Alternatively or additionally, the one or more attributes may be incorporated into the BGP communities path attribute described in Request for Comments 1997, which is hereby incorporated by reference in its entirety for all purposes.

The routing protocol daemon can run on a Software-Defined Networking (SDN) controller associated with a control plane of spoke network of multiple spoke networks of the SD-WAN and can tag the subnet with a route tag using a route map. The tagging can be performed based on the one or more attributes meeting network administrator-defined match criteria for corresponding one or more attributes associated with the route tag in the route map. The routing protocol daemon can further communicate the tagged subnet to an SD-WAN daemon running on the SDN controller via communication path between the routing protocol daemon and the SD-WAN daemon. Any inter-process communication mechanism provided by the operating system (e.g., socket communication, pipe communication, file system, or shared memory) can be employed as the communication path. In response to receiving the tagged subnet via the communication path, the SD-WAN daemon can translate an SD-WAN service rule defined in terms of the route tag to an SD-WAN service rule defined in terms of the subnet. Furthermore, the SD-WAN daemon can cause a load balancer associated with a data plane of the spoke network to perform load balancing of incoming network traffic received by the load balancer. The load balancing can be performed in accordance with the SD-WAN service rule defined in terms of the subnet by installing the SD-WAN service rule within the load balancer.

According to an embodiment, the hub can broadcast the subnet and the one or more attributes via a dynamic routing protocol, e.g., BGP, for receipt and processing by the routing protocol daemon.

According to an embodiment, the one or more attributes can include any or a combination of interface, Internet Protocol (IP) address, metric, route-type, autonomous system path, community list and origin code.

According to an embodiment, the client device can comprise an IP phone and the SD-WAN service rule defined in terms of the subnet can comprise an IP phone service rule.

Figure 1:
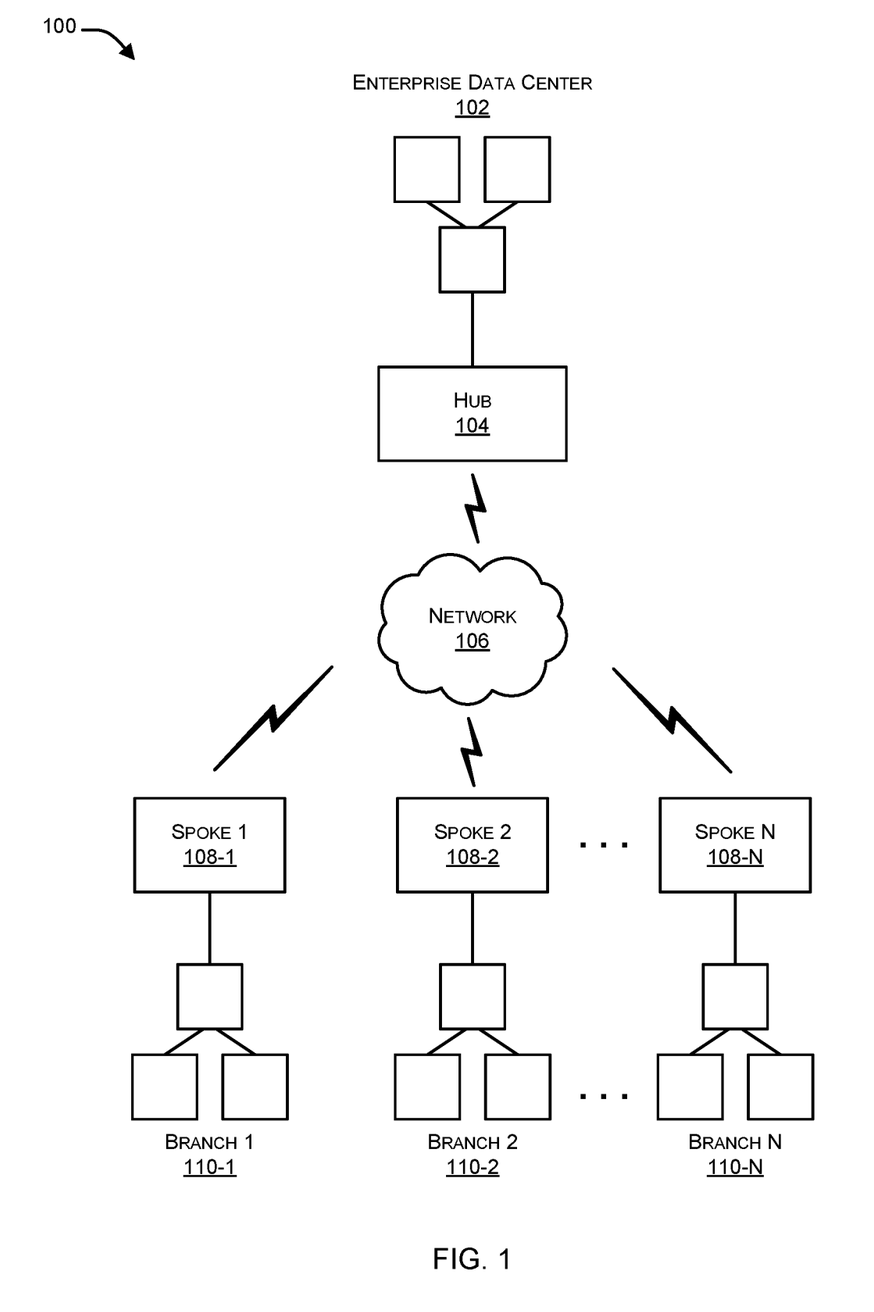
FIG. 1 illustrates a simplified architecture representing a hub and spoke topology in which aspects of the present invention can be implemented in accordance with an embodiment of the present invention.

FIG. 1 illustrates a simplified architecture 100 representing a hub and spoke topology in which aspects of the present invention can be implemented in accordance with an embodiment of the present invention. According to hub-and-spoke architecture 100, all remote sites, such as branch networks 110-1, 110-2 . . . 110-N (which may be collectively referred to as branches 110 and may be individually referred to as branch 110, hereinafter) can be communicatively coupled with an enterprise data center 102 through a network 106 using spokes 108-1, 108-2 . . . 108-N (which may be collectively referred to as spokes 108 and may be individually referred to as spoke 108, hereinafter) and a hub 104. Thus, branches 110 can be considered as spokes of a bicycle wheel, which connect to hub of the bicycle wheel, i.e., enterprise data center 102 in the context of the present example.

In the context of network architecture 100, connections, e.g., virtual private network connections, from a central network unit, i.e., hub 104, radiate to a number of remote spokes 108. Hub 104 can enable connectivity between enterprise data center 102 and branches 110 corresponding to spokes 108 and can also act as a gateway for spokes 108 to communicate with each other. Thus, traffic can pass between enterprise data center 102 via hub 104 and branches 110 via corresponding spokes 108. Further, site-to-site connections between spokes 108 do not exist and hence, hub 104 can also enable the traffic to pass between branches 110 via corresponding spokes 108. Thus, hub 104 can function as a concentrator on network 106 by managing all connections between spokes 108.

Those skilled in the art will appreciate that, network 106 in architecture 100 can include one or more wireless networks, one or more wired networks or a combination thereof that can be implemented as one of the different types of networks, such as Intranet, Local Area Network (LAN), Wide Area Network (WAN), Internet, and the like. Further, the networks can either be dedicated networks or shared networks. The shared networks represent an association of the different types of networks that use a variety of protocols, for example, Hypertext Transfer Protocol (HTTP), Transmission Control Protocol/Internet Protocol (TCP/IP), Wireless Application Protocol (WAP), and the like. Further, hub 104 and spokes 108 behind which enterprise data center 102 and branches 110 reside, respectively, can be implemented using any network device (e.g., a router) or a network security device (e.g., a network gateway or a UTM appliance).

Those skilled in the art will further appreciate that embodiments of the present disclosure enhance adaption of cloud connectivity by combining SD-WAN service rules with dynamic routing protocols. According to an embodiment, in order to support dynamic services, when an active client registers on hub network or enterprise data center 102 of the SD-WAN, hub 104 can allocate a subnet to the client. This subnet can be treated as a signature of the client such that with the help of a dynamic routing protocol, e.g., BGP, the subnet along with one or more attributes of the path or the route to a group of clients including the newly registered client within this subnet can be broadcast to spokes 108. However, route-tags are typically used as the signature of a client in an SD-WAN service rule. As such, a mechanism is needed to translate SD-WAN service rules, defined with reference to route-tags, to policies applicable to the dynamically allocated subnets. As described further below, at spoke 108, using a route map, associating one or more attributes with route-tags, that is defined by the network administrator, subnets carried by the dynamic routing protocol can be associated with corresponding route-tags based on finding matching attributes in the route map. Thus, when the subnet with attributes is received at the spoke via the dynamic routing protocol, the subnet can be appended with a route-tag internally by finding the matching attributes in the route map and further, the subnet can be injected into the corresponding SD-WAN service rule, thereby allowing SD-WAN service rules defined by the network administrator with reference to routing-tags to be applied to corresponding clients based on the subnets dynamically allocated by the hub. Furthermore, a best quality path (e.g. low latency, low jitter or packet loss) can be found for the subnet using the service rule. As a result, all traffic destined to the subnet can follow the best quality path.

Figure 2:
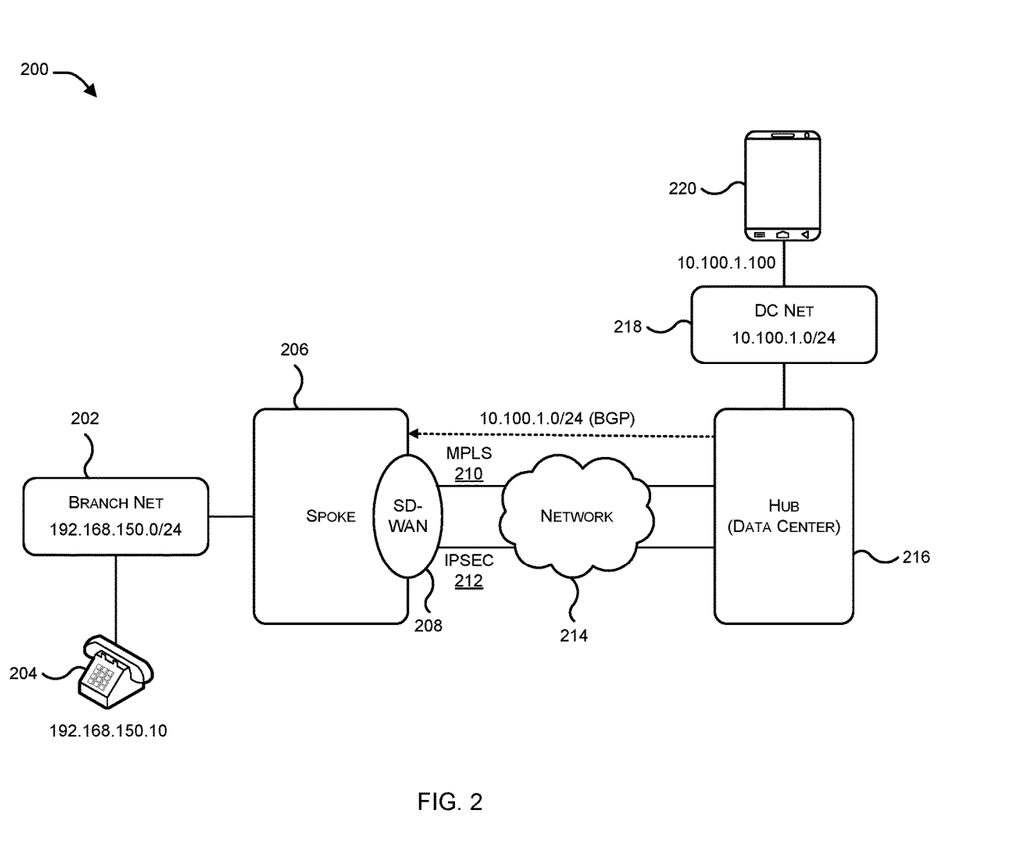
FIG. 2 illustrates an example in which an SD-WAN dynamic service is implemented in a hub and spoke topology in accordance with an embodiment of the present invention.

FIG. 2 illustrates an example in which an SD-WAN dynamic service is implemented in a hub and spoke topology in accordance with an embodiment of the present invention. In the context of the present example, the client device can be an IP phone 220 that can register with data centre 216, IP phone 220 is allocated a subnet, i.e., DC net 218 of 10.100.1.0/24 based on its IP address of 10.100.1.100. An SD-WAN controller (not shown) of SD-WAN 208 associated with spoke 206 can then be notified regarding the existence of new client device (e.g., IP phone 206) by the hub (data center 216) broadcasting the subnet through network 214 via BGP with community 10 as an attribute. In the context of BGP, the community attribute can be used to carry the one or more attribute(s) of the path or the route to a group of one or more clients including IP phone 220 that are associated with the subnet. For other routing protocols (e.g., RIP, IGRP, EIGRP and OSPF) other attributes, such as interface, IP address, metric, route-type, autonomous system path, community list, origin code and the like can be used. Spoke 206 administrator can define a route-map to append all subnet with a community attribute of 10 with a route tag 3, for example, and assign an SD-WAN IP phone service rule for route-tag 3 to a least jitter path. So, once the subnet 10.1.1.0/24 is received at spoke 206, the subnet can be associated with route-tag 3 and inserted into the SD-WAN IP phone service rule. In the present example, spoke 206 makes use of multiple paths (e.g., one using MPLS 210 and another using IPSec 212 through network 214 to data center 216. This facilitates stable and efficient cloud connectivity. SD-WAN 208 is expected to implement intelligent link load balancing based on the quality of these links. Therefore, continuing with the current example in which a caller uses client 204 on branch net 202 to initiate a connection with subnet 218, i.e., 10.1.100.0/24, allocated to IP phone 220, SD-WAN 208 can appropriately direct traffic destined for IP phone 204 to the lowest jitter path, for example, based on the translated SD-WAN service rule associated with IP phone 204 as described further below.

Figure 3:
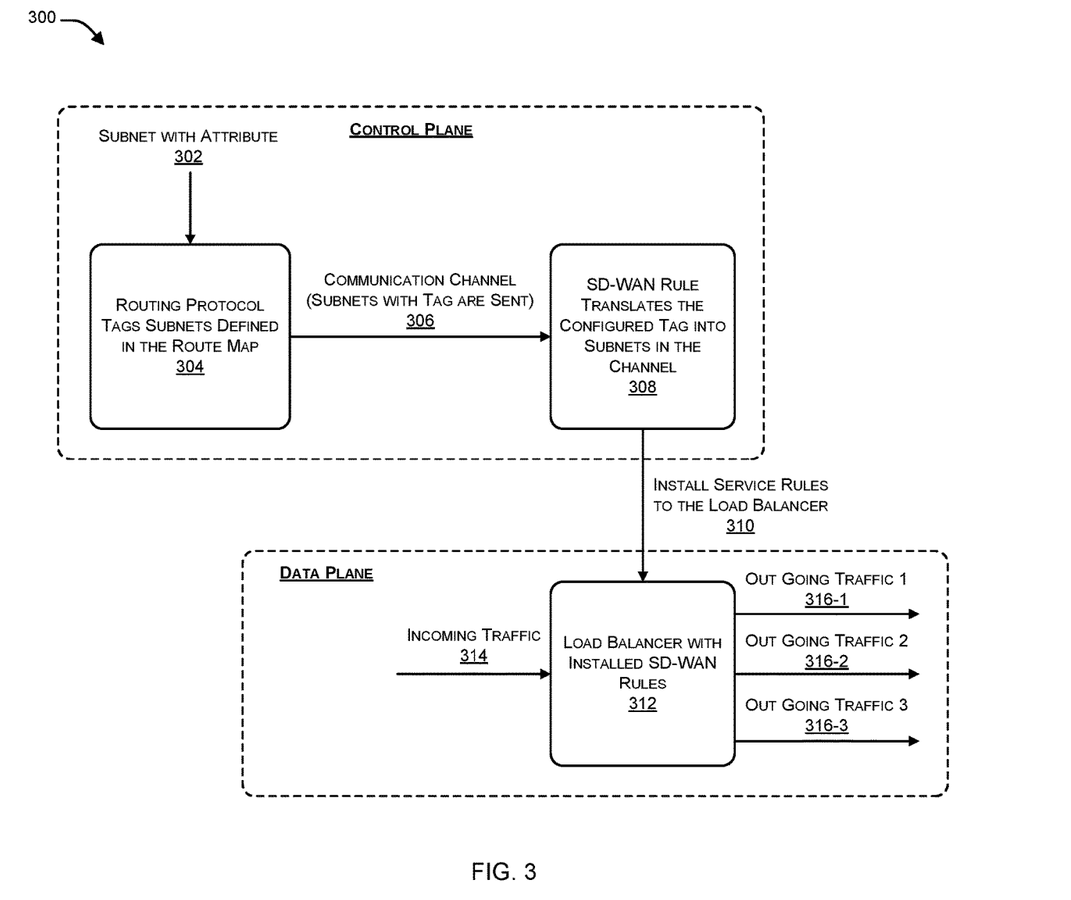
FIG. 3 illustrates an exemplary data flow in a spoke in accordance with an embodiment of the present invention.

FIG. 3 illustrates an exemplary data flow in a spoke 300 in accordance with an embodiment of the present invention. In the context of the present example, spoke 300 is logically divided into a control plane and a data plane. In an SD-WAN, having multiple spokes and a hub network, a routing protocol daemon 304 and an SD-WAN daemon 308 run on a SDN controller associated with the control plane of the spoke network. Further, a load balancer 312 is associated with the data plane of the spoke network.

According to an embodiment, when a client device registers with the hub network of the SD-WAN, the hub assigns a subnet to the client device and can broadcast the subnet and the one or more attributes via a dynamic routing protocol, e.g., Border Gateway Protocol (BGP), such that at 302, routing protocol daemon 304 receives the subnet along with the one or more attributes. The attributes used to convey the information regarding the path or the route to the group of clients within this subnet can include, but are not limited to, any or a combination of interface, Internet Protocol (IP) address, metric, route-type, autonomous system path, community list, origin code, and the like. In an embodiment, the subnet can be learned by the routing protocol daemon from other spokes of the SD-WAN.

In the context of the present example, a routing protocol daemon 304 can tag the received subnet with a route tag using a route map (an example of which is described with reference to FIG. 4). The tagging of a subnet is performed based on the one or more attributes communicated via the dynamic routing protocol with the subnet meeting a match criteria defined by a network administrator for corresponding one or more attributes associated with the route tag in the route map. At 306, routing protocol daemon 304 can communicate the tagged subnet to SD-WAN daemon 308 via a communication channel (e.g., a shared memory) between routing protocol daemon 304 and SD-WN daemon 308. Further, responsive to receiving the tagged subnet by SD-WAN daemon 308, SD-WAN daemon 308 translates an SD-WAN service rule defined in terms of the route tag to an SD-WAN service rule defined in terms of the subnet. In an implementation, the client device includes an IP phone such that the SD-WAN service rule defined in terms of the subnet can include an IP phone service rule.

In the context of the present example, at 310, SD-WAN daemon 308 can install the translated SD-WAN service rule within load balancer 312. In this manner, load balancer 312 is configured by the SD-WAN controller to perform load balancing of incoming network traffic received by load balancer 312 in accordance with the translated SD-WAN service rule defined in terms of the subnet. Therefore, incoming traffic 314 that matches the translated SD-WAN service rule can be distributed onto the desired member links 316-1, 316-2 and 316-3 based on the translated SD-WAN service rule.

Figure 4:
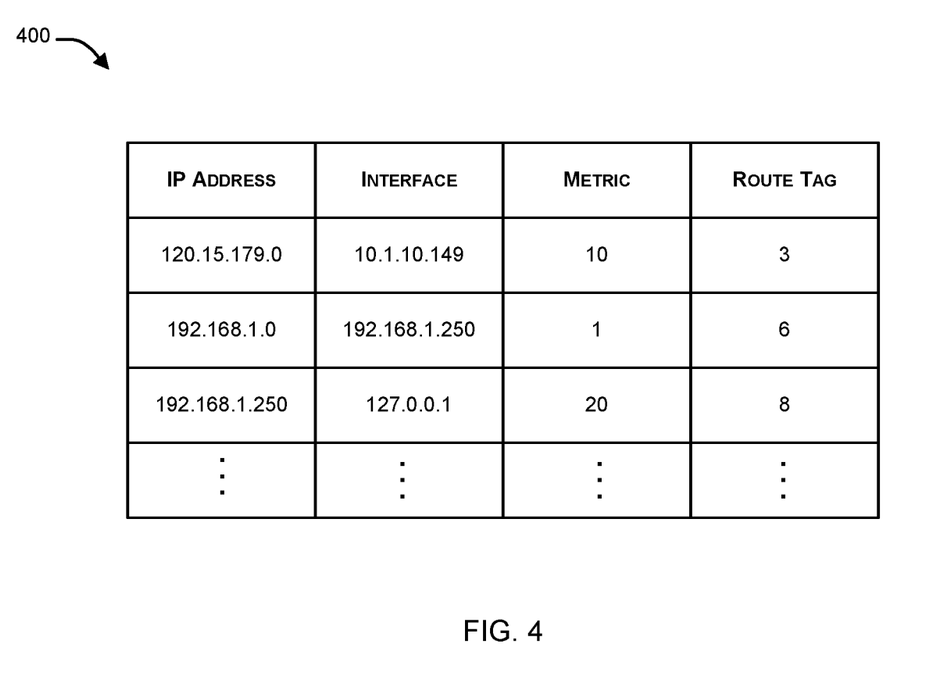
FIG. 4 illustrates an exemplary route-map in accordance with an embodiment of the present invention.

FIG. 4 illustrates an exemplary route-map 400 in accordance with an embodiment of the present invention. In an implementation, the network administrator can define route map 400 so as to tag various subnets received by the routing protocol daemon along with corresponding attributes with appropriate route tags based on the one or more attributes received with the subnet via the dynamic routing protocol matching of one or more attributes in route-map 400. The attributes can include any or a combination of interface, IP address, metric, route-type, autonomous system path, community list, origin code etc. When the routing protocol daemon receives the subnet with attributes from the hub, the routing protocol daemon can match one or more of the received attributes against entries of the route-map 400 to tag the received subnet with the route tag of the matching entry. Further, the route tag and the corresponding subnet can be communicated to the SD-WAN daemon to facilitate translation of an SD-WAN service rule defined in terms of the route tag to an SD-WAN service rule defined in terms of the subnet.

Figure 5A:
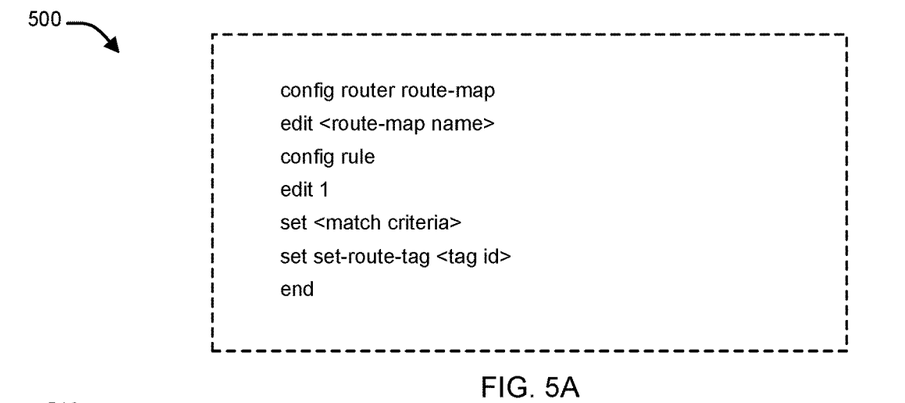
FIGS. 5A-C are command line interface (CLI) fragments illustrating exemplary implementation details relating to defining a route-map in accordance with an embodiment of the present invention.
Figure 5B:
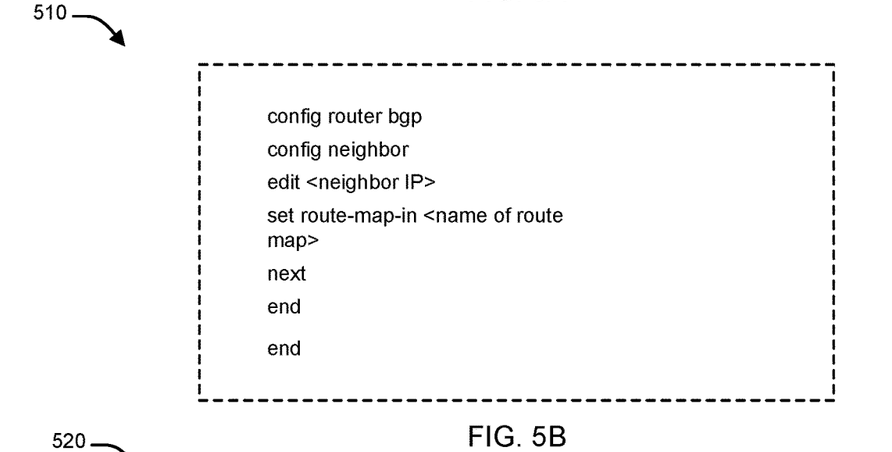
Figure 5C:
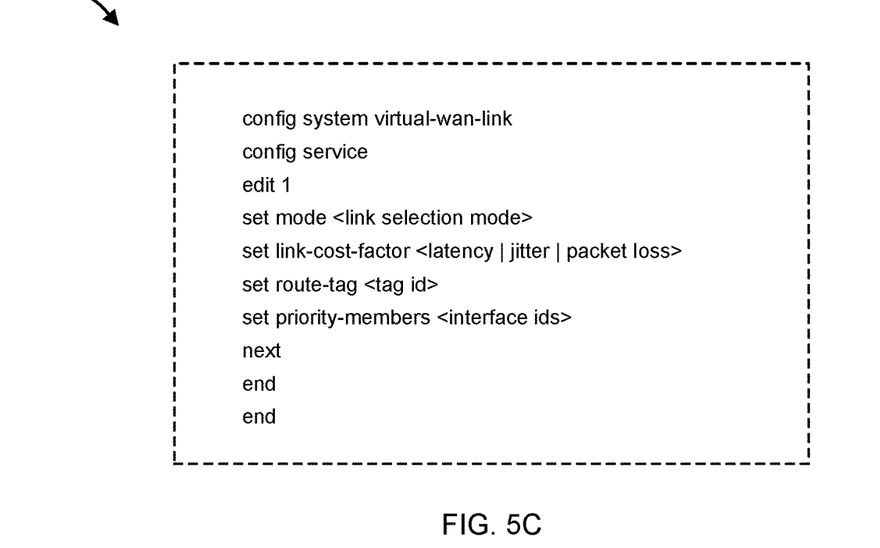

FIGS. 5A-C are CLI fragments 500, 510 and 520 illustrating exemplary implementation details relating to defining a route-map in accordance with an embodiment of the present invention.

FIG. 5A illustrates a router configuration via CLI fragment 500 that defines a route-map. The "<match criteria>" defines match conditions according to which route attributes of the route, such as interfaces, IP address, metric, route type etc. For BGP, match conditions for the one or more attributes, such as as-path (autonomous system path), community list and origin code can be defined. In this manner, the routing protocol daemon can use the defined route map to identify the route tag (e.g., <tag-id>) associated with a subnet and corresponding attributes received via a dynamic routing protocol and form an association between the route tag and the received subnet, thereby tagging the subnet.

FIG. 5B illustrates an exemplary CLI fragment 510 for communication of a route-map to a peer (other spokes). The defined configuration for route-map can vary based on routing protocols. CLI fragment 510 is an example CLI fragment assuming BGP is the dynamic routing protocol. In the context of the present example, the "<name of route map>" is the route map defined with reference to FIG. 5A in accordance with CLI fragment 500. The configuration as defined by CLI fragment 510 indicates all routes/subnets received from the BGP peer "<neighbor IP>" that matches "<match-criteria>" are to be tagged with "<tag-id>".

FIG. 5C illustrates an exemplary CLI fragment 520 for application of the route tag to the SD-WAN service rule. The "<link selection mode>" and "link-cost-factor" are defined to find a best quality path, with the least latency, least jitter or least packet loss, for the service at issue. The path can be selected from "priority-members". The service can be defined in route-tag by "<tag id>", which is the same as the "<tag id>" in the route map. The "<tag id>" can refer the routes matching the "<match-criteria>" learned from the peers. So, these routes can be dynamically updated, avoiding manually configuring the routes in the service, and significantly reducing the administrative workload.

Figure 6A:
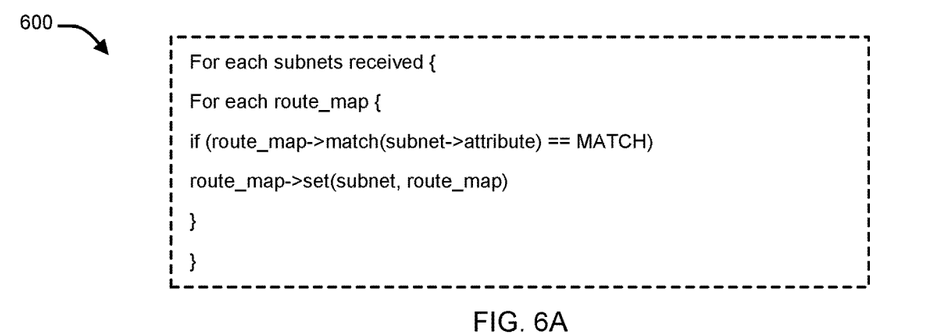
FIGS. 6A-C are pseudo code fragments illustrating exemplary implementation details relating to data-flow at a spoke in accordance with an embodiment of the present invention.
Figure 6B:
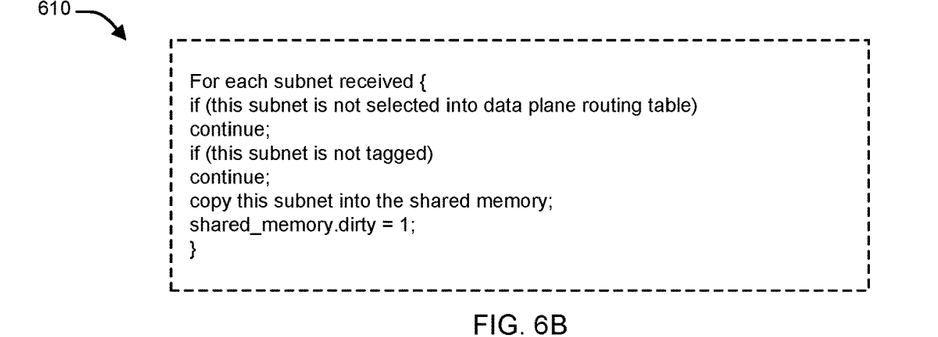
Figure 6C:
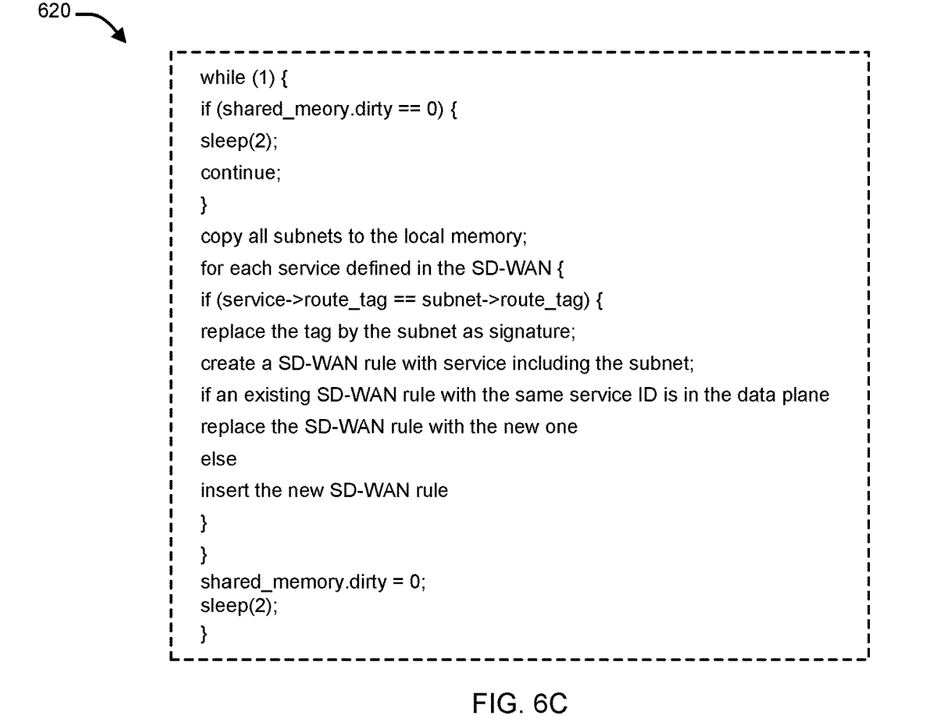

FIGS. 6A-C are pseudo code fragments 600, 610 and 620 illustrating exemplary implementation details relating to data flow at a spoke in accordance with an embodiment of the present invention.

FIG. 6A illustrates a pseudo code fragment 600 for adding a route tag for subnets defined in the route map. In the context of the present example, pseudo code fragment 600 uses the defined "route map" to find a route map entry having attributes matching those associated with the subnet. When a match is found, a new set function is used to tag the subnet. The tag value is defined above in CLI fragment 500. In the context of the present example, the new set function can be expressed as follows:

subnet->attribute->route tag =<route map->rule->route tag-value>

FIG. 6B illustrates an exemplary pseudo code fragment 610 for communicating the route tag to the SD-WAN. After the routing protocol daemon has appended the route tag to the subnet as described above with reference to FIG. 6A, for example, the routing protocol daemon can write the tagged subnets into the communication channel and can notify the SD-WAN. Pseudo code fragment 610 adds only those received subnets that have been tagged to the data plane routing table (via a shared memory in this example) such that the subnet can be used to forward traffic. The dirty flag of the shared memory can be used to notify the SD-WAN daemon regarding the existence of new routes in the shared memory.

FIG. 6C illustrates an exemplary pseudo code fragment 620 performed by an SD-WAN daemon. In the context of the present example, SD-WAN daemon periodically checks the shared memory dirty flag every 2 seconds. When the dirty flag is set, the SD-WAN daemon reads all subnets from the shared memory and installs new service rules or replaces existing service rules using the subnet as the signature rather than the route tag, thereby translating the original service rules defined with reference to route tags to service rules defined with reference to subnets.

Figure 7:
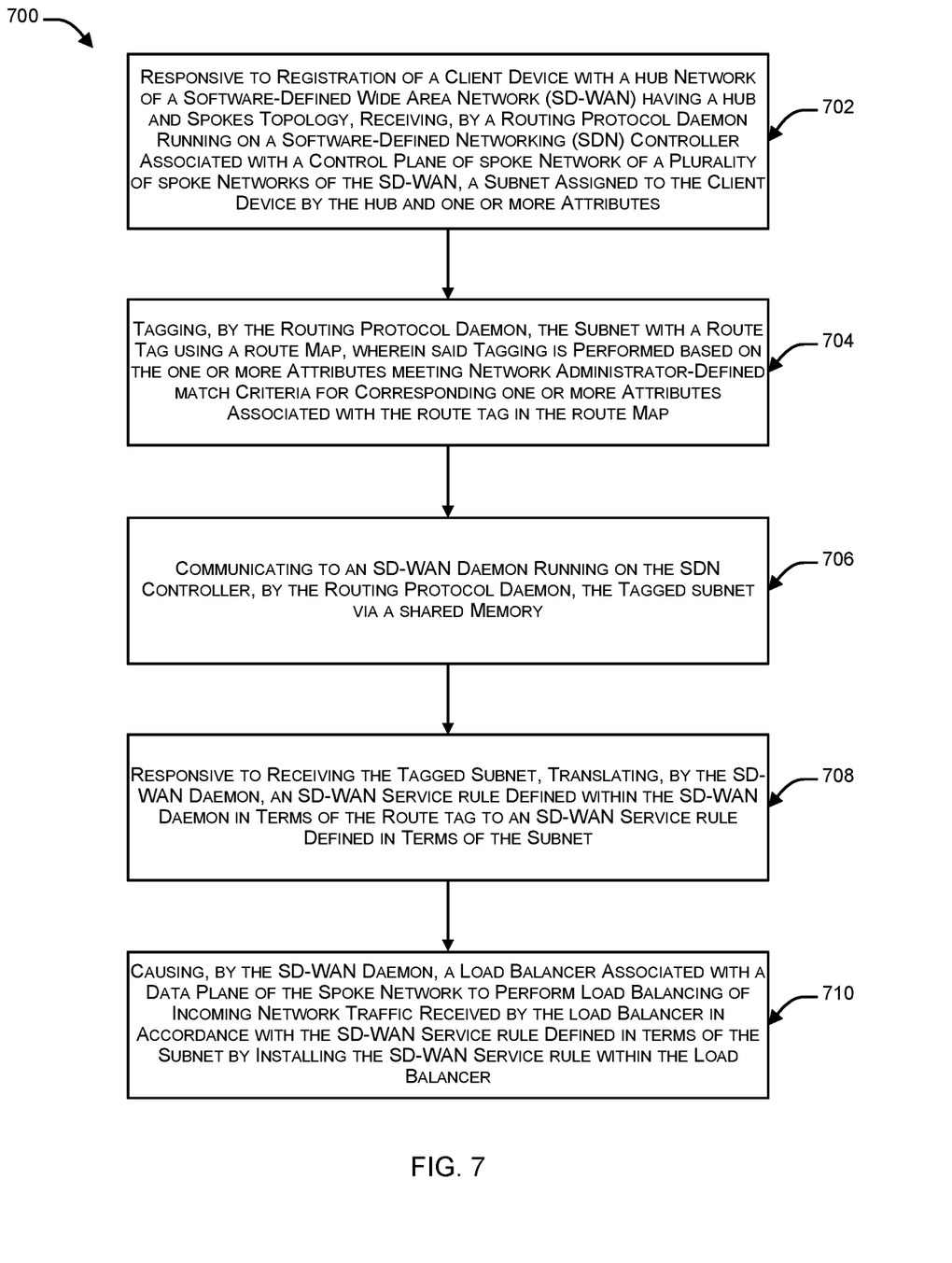
FIG. 7 is a high-level flow diagram illustrating a process for dynamic load balancing in SD-WAN in accordance with an embodiment of the present invention.

FIG. 7 is a high-level flow diagram 700 illustrating a process for dynamic load balancing in an SD-WAN having a hub and spokes topology in accordance with an embodiment of the present invention. In the context of the present example, at block 702 in response to registration of a client device with the hub network of the SD-WAN, a routing protocol daemon can receive a subnet assigned to the client device by the hub and one or more attributes of the path or the route to a group of one or more clients within this subnet. The routing protocol daemon can run on an SDN controller associated with a control plane of a spoke network of multiple spoke networks associated with the SD-WAN.

At block 704, the routing protocol daemon tags the subnet with a route tag using a route map. The tagging can be performed based on the one or more attributes communicated via the dynamic routing protocol with the subnet meeting network administrator-defined match criteria for corresponding one or more attributes associated with the route tag in the route map.

At block 706, the routing protocol daemon can communicate the tagged subnet to an SD-WAN daemon running on the SDN controller via a communication channel (e.g., a shared memory) between the SD-WAN daemon and the routing protocol daemon.

At block 708, in response to receiving the tagged subnet, the SD-WAN daemon translates an SD-WAN service rule defined with reference to the route tag to an SD-WAN service rule defined with reference to the subnet.

At block 710, the SD-WAN daemon can cause a load balancer associated with a data plane of the spoke network to perform load balancing of incoming network traffic received by the load balancer. The load balancing can be performed in accordance with the translated SD-WAN service rules (i.e., those now defined in terms of the subnet) by installing the translated SD-WAN service rules within the load balancer.

Embodiments of the present disclosure include various steps, which have been described above. A variety of these steps may be performed by hardware components or may be embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Figure 8:
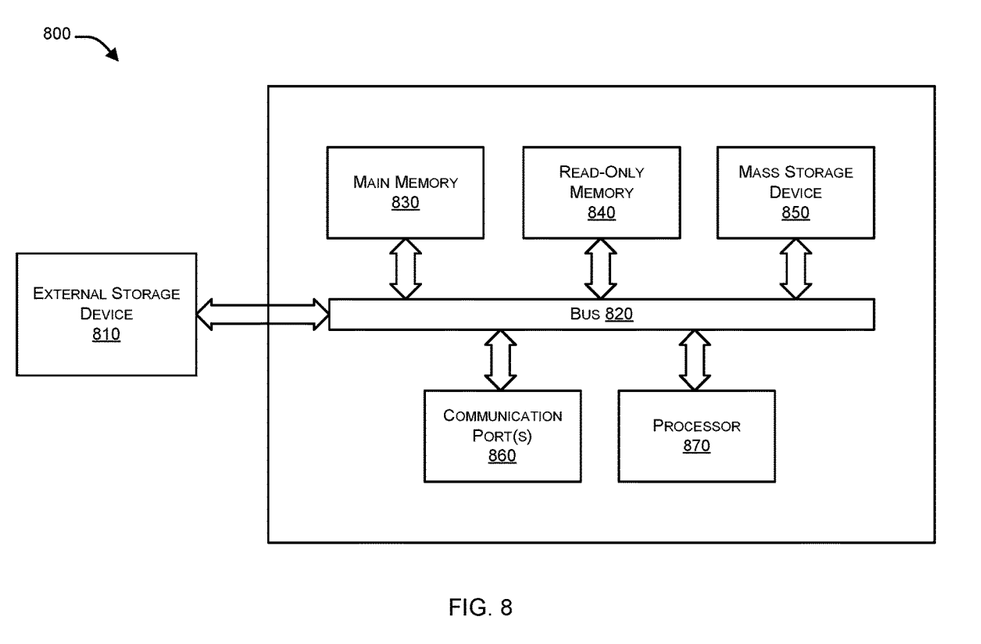
FIG. 8 illustrates an exemplary computer system in which or with which embodiments of the present invention may be utilized.

FIG. 8 illustrates an exemplary computer system 800 in which or with which embodiments of the present invention may be utilized. Computer system 800 may represent all or a portion of a spoke 108 (e.g., a network device or network security device implementing an SD-WAN controller, for example) or a load balancer within a spoke network. As shown in FIG. 8, computer system 800 includes an external storage device 810, a bus 820, a main memory 830, a read only memory 840, a mass storage device 850, a communication port 860, and a processor 870.

Those skilled in the art will appreciate that computer system 800 may include more than one processor 870 and communication ports 860. Examples of processor 870 include, but are not limited to, an Intel® Itanium® or Itanium 2 processor(s), or AMD® Opteron® or Athlon MP® processor(s), Motorola® lines of processors, Forti-SOC™ system on a chip processors or other future processors. Processor 870 may include various modules associated with embodiments of the present invention.

Communication port 860 can be any of an RS-232 port for use with a modem based dialup connection, a 10/100 Ethernet port, a Gigabit or 10 Gigabit port using copper or fiber, a serial port, a parallel port, or other existing or future ports. Communication port 860 may be chosen depending on a network, such a Local Area Network (LAN), Wide Area Network (WAN), or any network to which computer system connects.

Memory 830 can be Random Access Memory (RAM), or any other dynamic storage device commonly known in the art. Read only memory 840 can be any static storage device(s) e.g., but not limited to, a Programmable Read Only Memory (PROM) chips for storing static information e.g. start-up or BIOS instructions for processor 870.

Mass storage 850 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 820 communicatively couples processor(s) 870 with the other memory, storage and communication blocks. Bus 820 can be, e.g. a Peripheral Component Interconnect (PCI)/ PCI Extended (PCI-X) bus, Small Computer System Interface (SCSI), USB or the like, for connecting expansion cards, drives and other subsystems as well as other buses, such a front side bus (FSB), which connects processor 870 to software system.

Optionally, operator and administrative interfaces, e.g. a display, keyboard, and a cursor control device, may also be coupled to bus 820 to support direct operator interaction with computer system. Other operator and administrative interfaces can be provided through network connections connected through communication port 860. External storage device 810 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A method comprising:
responsive to registration of a client device with a hub network of a Software-Defined Wide Area Network (SD-WAN) having a hub and spokes topology, receiving, by a routing protocol daemon running on a Software-Defined Networking (SDN) controller associated with a control plane of spoke network of a plurality of spoke networks of the SD-WAN, a subnet assigned to the client device by the hub and one or more attributes of a path or a route to a group of clients within the subnet;
tagging, by the routing protocol daemon, the subnet with a route tag using a route map, wherein said tagging is performed based on the one or more attributes meeting network administrator-defined match criteria for corresponding one or more attributes associated with the route tag in the route map;
communicating to an SD-WAN daemon running on the SDN controller, by the routing protocol daemon, the tagged subnet via a communication channel between the SD-WAN daemon and the routing protocol daemon;
responsive to receiving the tagged subnet, translating, by the SD-WAN daemon, an SD-WAN service rule defined with reference to the route tag to an SD-WAN service rule defined with reference to the subnet;
causing, by the SD-WAN daemon, a load balancer associated with a data plane of the spoke network to perform load balancing of incoming network traffic received by the load balancer in accordance with the translated SD-WAN service rule by installing the translated SD-WAN service rule within the load balancer.

2. The method of claim 1, wherein said receiving is as a result of the hub broadcasting the subnet and the one or more attributes via a dynamic routing protocol.

3. The method of claim 2, wherein the dynamic routing protocol comprises Border Gateway Protocol (BGP).

4. The method of claim 1, wherein the one or more attributes include any or a combination of interface, Internet Protocol (IP) address, metric, route-type, autonomous system path, community list and origin code.

5. The method of claim 1, wherein client device comprises an IP phone and wherein the translated SD-WAN service rule comprises an IP phone service rule.

6. The method of claim 1, wherein the communication channel comprises a shared memory.

7. A non-transitory computer-readable storage medium embodying a set of instructions, which when executed by one or more processors of a software-defined network (SDN) controller associated with a spoke network of one or more spoke networks of a Software-Defined Wide Area Network (SD-WAN) having a hub and spokes topology, causes the one or more processors to perform a method comprising:
responsive to registration of a client device with a hub network of the SD-WAN, receiving, by a routing protocol daemon running on the SDN controller, a subnet assigned to the client device by the hub and one or more attributes of a path or a route to a group of clients within the subnet;
tagging, by the routing protocol daemon, the subnet with a route tag using a route map, wherein said tagging is performed based on the one or more attributes meeting network administrator-defined match criteria for corresponding one or more attributes associated with the route tag in the route map;
communicating to an SD-WAN daemon running on the SDN controller, by the routing protocol daemon, the tagged subnet via a communication channel between the SD-WAN daemon and the routing protocol daemon;
responsive to receiving the tagged subnet, translating, by the SD-WAN daemon, an SD-WAN service rule defined with reference to the route tag to a translated SD-WAN service rule defined with reference to the subnet;
causing, by the SD-WAN daemon, a load balancer associated with a data plane of the spoke network to perform load balancing of incoming network traffic received by the load balancer in accordance with the translated SD-WAN service rule by installing the translated SD-WAN service rule within the load balancer.

8. The non-transitory computer-readable storage medium of claim 7, wherein said receiving is as a result of the hub broadcasting the subnet and the one or more attributes via a dynamic routing protocol.

9. The non-transitory computer-readable storage medium of claim 8, wherein the dynamic routing protocol comprises Border Gateway Protocol (BGP).

10. The non-transitory computer-readable storage medium of claim 8, wherein the one or more attributes include any or a combination of interface, Internet Protocol (IP) address, metric, route-type, autonomous system path, community list and origin code.

11. The non-transitory computer-readable storage medium of claim 7, wherein client device comprises an IP phone and wherein the translated SD-WAN service rule comprises an IP phone service rule.

12. The non-transitory computer-readable storage medium of claim 7, wherein the communication channel comprises a shared memory.

13. A software-defined network (SDN) controller comprising:
a processing resource; and
a non-transitory computer-readable medium, coupled to the processing resource, having stored therein instructions that when executed by the processing resource cause the processing resource to perform a method comprising:

responsive to registration of a client device with a hub network of a Software-Defined Wide Area Network (SD-WAN) having a hub and spokes topology, receiving, by a routing protocol daemon, a subnet assigned to the client device by the hub and one or more attributes of a path or a route to a group of clients within the subnet;

tagging, by the routing protocol daemon, the subnet with a route tag using a route map, wherein said tagging is performed based on the one or more attributes meeting network administrator-defined match criteria for corresponding one or more attributes associated with the route tag in the route map;

communicating, by the routing protocol daemon, to an SD-WAN daemon the tagged subnet via a communication channel between the SD-WAN daemon and the routing protocol daemon;

responsive to receiving the tagged subnet, translating, by the SD-WAN daemon, an SD-WAN service rule defined with reference to the route tag to a translated SD-WAN service rule defined with reference to the subnet;

causing, by the SD-WAN daemon, a load balancer associated with a data plane of a spoke network of the SD-WAN to perform load balancing of incoming network traffic received by the load balancer in accordance with the translated SD-WAN service rule by installing the translated SD-WAN service rule within the load balancer.

14. The system of claim 13, wherein said receiving is as a result of the hub broadcasting the subnet and the one or more attributes via a dynamic routing protocol.

15. The system of claim 14, wherein the dynamic routing protocol comprises Border Gateway Protocol (BGP).

16. The system of claim 14, wherein the one or more attributes include any or a combination of interface, Internet Protocol (IP) address, metric, route-type, autonomous system path, community list and origin code.

17. The system of claim 13, wherein client device comprises an IP phone and wherein the translated SD-WAN service rule comprises an IP phone service rule.

18. The system of claim 13, wherein the communication channel comprises a shared memory.

* * * * *